Patented June 18, 1935

2,005,711

UNITED STATES PATENT OFFICE

2,005,711

PREPARATION OF ORGANIC FLUORINE COMPOUNDS

Herbert Wilkens Daudt and Mortimer Alexander Youker, Wilmington, Del., assignors to Kinetic Chemicals, Inc., Wilmington, Del., a corporation of Delaware No Drawing. Application June 15, 1934, Serial No. 730,842. In Canada May 20, 1931

12 Claims. (Cl. 260—162)

This invention relates to fluorine derivatives of methane, more particularly monofluoro derivatives of methane which also contain a halogen atom other than fluorine such as, for example, chlorine, and a process for the production thereof.

This application is a continuation-in-part of our co-pending applications, Serial Nos. 483,289; 628,154; 631,162; 686,618 and 717,514.

Collie, British Chemical Society Journal Transactions, Volume 55, 1899), pages 110–113, describes the production of monochloro-monofluoro-methane by the action of chlorine on methyl fluoride. The equation which he gives for this reaction is as follows:

$$CH_3F + Cl_2 \rightarrow CH_2ClF + HCl$$

The methyl fluoride was prepared by the action of heat on tetra-methyl-ammonium fluoride. Another method of preparing methyl fluoride is by the action of methyl iodide on silver fluoride, referred to by Collie as the method given by Moissan. It will be apparent that methyl fluoride is a relatively expensive starting material and that, therefore, the process given by Collie for the production of fluorine derivatives of methane leaves much to be desired from the practical point of view.

It is an object of the present invention to provide a new and improved process for the production of fluorine derivatives of methane that contain two atoms of hydrogen. Another object is the production of monofluoro-halo derivatives of methane containing a halogen atom other than fluorine. A further object is the production of monofluoro-monochloro-methane having a boiling point of about $-10°$ C. A still further object is the preparation of mixtures of monofluoro-monochloro-methane and other fluorine derivatives of methane having various boiling points. Other objects will appear hereinafter.

In accomplishing these objects according to the present invention, we have found that methylene fluoro derivatives may be prepared by treating a methylene halide, such as methylene chloride ($CH_2Cl_2$), with a fluorinating agent. The use of a starting material such as methylene chloride has the advantage that the process is a practical one for commercial operations. Methylene chloride is much easier to prepare than methyl fluoride, and its use enables the production of not only substantially pure monofluoro-monochloro-methane but mixtures thereof with methylene fluoride ($CH_2F_2$). Furthermore, if desired, methylene fluoride may be separated in substantially pure form. Both of the resultant products are useful as refrigerants in the usual processes of condensation followed by evaporation in the vicinity of a body to be cooled.

The invention will be further understood, but is not limited, by the following examples, in which the quantities are stated in parts by weight.

Example I

Hydrogen fluoride and methylene chloride in approximately equimolecular proportions were added to an antimony fluoro-chloride catalyst maintained at a temperature of about 70° C. under a pressure of 25 (gauge) pounds per square inch. A mixture of fluorinated derivatives and of unconsumed methylene chloride was obtained. From the fluorinated product there were isolated a substance boiling at approximately $-10°$ C. and a substance boiling at approximately $-50°$ C. These two substances were, respectively, monofluoro-monochloro-methane ($CH_2FCl$) and methylene fluoride ($CH_2F_2$).

The hydrogen fluoride and methylene chloride may be added to the antimony halide catalyst simultaneously or consecutively. For instance, the hydrogen fluoride may be added first, followed by the methylene chloride. The antimony halide may consist initially of antimony pentachloride. If the hydrogen fluoride is first added to the antimony pentachloride and the resultant antimony fluorochloride reacted with the methylene chloride, the antimony fluorochloride will become depleted of fluorine unless further fluorine in some form is added. The simultaneous regeneration with hydrogen fluoride is preferred.

Example II

To 8000 parts of previously used antimony catalyst containing 15 to 18% fluorine, there were added 170 parts of hydrogen fluoride and 935 parts of $CH_2Cl_2$ at a temperature of 78° C. to 83° C. under atmospheric pressure. The gaseous product was washed with water, condensed and fractionated to produce monofluoro-monochloro-methane ($CH_2FCl$), boiling at about $-10°$ C., and methylene fluoride ($CH_2F_2$), boiling at about $-50°$ C. The yield of monofluoro-monochloro-methane was approximately twice the yield of methylene fluoride.

Example III

Hydrogen fluoride was added to antimony pentachloride to produce an antimony fluorochlorid which analyzed approximately 11% trivalent antimony and approximately 14.8% fluorine.

To 8000 parts of this antimony fluorochloride catalyst were added 1050 parts of methylene chloride. The temperature was gradually raised from about 40° C. to about 100° C. The gases were passed into water, where a large part of the product, boiling at about 33° C., condensed. The product which passed through the water was dried with sulfuric acid and condensed with solid carbon dioxide. This product had an initial boiling point below 10° C.

*Example IV*

A mixture of 3600 parts of antimony trifluoride and 3000 parts of antimony pentachloride was prepared, and 1000 parts of chlorine were added. The temperature was kept somewhat above 50° C., and to the resultant mixture 1000 parts of methylene chloride were added. The temperature was then gradually raised to 100° C., and the evolved vapors were purified and dried as in Example III, similar products being obtained.

*Example V*

Methylene chloride ($CH_2Cl_2$) and hydrogen fluoride were passed simultaneously into antimony pentachloride at a temperature of 40° C. to 70° C. A product was condensed in solid carbon dioxide; it boiled at a temperature around 0° C., giving off a gas insoluble in water and which did not support combustion. The presence of fluorine in this product was shown. It was most probably a mixture of monofluoro-monochloro-methane (boiling point about −10° C.), methylene fluoride and some methylene chloride.

In a similar manner, the processes of the invention may be applied to other methylene halides such as, for example, methylene bromide, to produce the corresponding fluoro-bromo compounds. In general, the fluorination of the bromine and iodine derivatives proceeds more easily than the fluorination of the chlorine derivatives.

Metal halides other than those of antimony may be used for the fluorinations. Among the fluorides that may be used are those of lead, zinc, silver, calcium and sodium. They may be used alone or in admixture with antimony pentahalides.

Hydrogen fluoride is a preferred fluorinating agent because of its commercial availability and because the by-product halide (e. g., HCl) is volatile. It may therefore be used in catalytic processes. The catalyst for such operations may be in liquid form (for example, as an antimony halide or a mixture of antimony halides), or it may be a solid (e. g., a metal halide impregnated on an inert support such as porous fused alumina, or an activated support such as activated carbon). The following metal chlorides may be used alone or in combination with either type of support: an antimony chloride, a copper chloride, platinic chloride, mercuric chloride, a vanadium chloride, a uranium chloride, silver chloride, nickel chloride, cobalt chloride, cadmium chloride, calcium chloride, zinc chloride and an iron chloride. Other halides of the same metals may be used. Certain types of carbon, such as wood charcoal, especially after they have been activated by one of the known processes of activation, are in themselves active catalysts. They may be used alone or in connection with one or more metal halides.

The methylene halide and hydrogen fluoride may be introduced into the catalyst in vapor or liquid phase, preferably in vapor phase where a supported catalyst is used.

It is usually preferable to carry out the fluorination in the presence of an antimony fluorohalide with simultaneous or subsequent regeneration of the antimony halide, preferably the former, by means of hydrogen fluoride. The fluorine content of the antimony halide is subject to variation but should preferably correspond to a composition represented empirically by $SbF_xHal_{5-x}$, where Hal is a halogen other than fluorine, and $x$ is any positive value less than five and preferably less than three. Antimony fluorochlorides containing about 3% to about 21% fluorine have given especially advantageous results. The proportions of pentavalent and trivalent antimony halides may be varied over essentially the entire possible range according to the results desired. A preferred pentavalent antimony halide range is 70% to 90% by weight of the total antimony catalyst.

If desired, the fluorinations may be effected in the presence of a diluent, for example, a previously fluorinated compound liquid at the temperatures employed, or the compound undergoing fluorination. The concentration of the antimony halide in the catalyst may be varied over a very wide range.

The temperature may vary within relatively wide limits, depending upon the nature of the particular fluorination reaction. The fluorination in the presence of antimony halides may ordinarily be conducted at relatively low temperatures, but may also be carried out at relatively high temperatures (e. g., 150° C.). Relatively higher temperatures are normally employed for the fluorination in the presence of a supported catalyst. The temperature may also vary depending upon the particular compound treated; that is, for example, where the compound treated is a chloro compound, the temperature may differ from that employed where the compound treated is a bromo compound. The same is true for different fluorinating agents.

The pressure may also vary within relatively wide limits, depending upon the nature of the fluorination reaction and the results desired. The pressure may be adapted to the boiling temperatures of the reacting components or products. Super-atmospheric pressures have given very desirable results.

It will be understood that the expression "hydrogen fluoride" is intended to cover not only anhydrous hydrofluoric acid but, also, hydrogen fluoride which may contain small amounts of impurities such as, for example, water.

The advantages of the invention have already been set forth to some extent. It enables the production of compounds which have valuable refrigerant properties from starting materials which are more easily obtainable and by a process which is more practical commercially than any heretofore known.

As many apparent and widely different embodiments of this invention may be made without departing from the spirit and scope thereof, it is to be understood that we do not limit ourselves to the specific embodiments thereof except as defined in the appended claims.

We claim:

1. In a process of producing fluorinated derivatives of methane, containing two atoms of hydrogen, the step which comprises reacting together hydrogen fluoride and methylene chloride in the presence of a heavy metal halide.

2. In a process of producing fluorinated derivatives of methane containing two atoms of hydrogen, the step which comprises reacting together hydrogen fluoride, methylene chloride and a heavy metal halide impregnated on a support.

3. In a process of producing fluorinated derivatives of methane containing two atoms of hydrogen, the step which comprises reacting together hydrogen fluoride, methylene chloride and a heavy metal halide supported on activated carbon.

4. In a process of producing fluorinated derivatives of methane containing two atoms of hydrogen, the step which comprises reacting methylene chloride with an antimony fluorochloride, and regenerating the antimony fluorochloride by the addition of hydrogen fluoride.

5. In a process of producing fluorinated derivatives of methane containing two atoms of hydrogen, the step which comprises simultaneously reacting together hydrogen fluoride, an antimony fluorochloride and methylene chloride.

6. In a process of producing fluorinated derivatives of methane containing two atoms of hydrogen, the step which comprises simultaneously reacting together hydrogen fluoride, methylene chloride and an antimony fluorochloride having the empirical formula $SbF_xCl_{5-x}$, in which $x$ is a positive value less than three, at a temperature of about 40° C. to about 150° C.

7. The process of claim 6 in which the reaction is effected under super-atmospheric pressure.

8. The process of producing monofluoro-monochloromethane which comprises reacting an antimony fluorochloride with methylene chloride at a temperature of about 70° C. to about 100° C., regenerating the fluorochloride by the addition of hydrogen fluoride, and separating the product boiling at about −10° C.

9. In a process of producing fluorinated derivatives of methane containing two atoms of hydrogen, the step which comprises adding hydrogen fluoride to a pentavalent antimony halide containing a halogen other than fluorine, and then heating the resultant product with methylene chloride.

10. The process of claim 9 in which the antimony halide initially employed is antimony pentachloride.

11. In a process of producing fluorinated derivatives of methane containing two atoms of hydrogen, the step which comprises reacting methylene chloride with a pentavalent antimony fluorohalide.

12. The process of claim 11 in which the pentavalent antimony fluorohalide is an antimony fluorochloride.

HERBERT WILKENS DAUDT.
MORTIMER ALEXANDER YOUKER.

CERTIFICATE OF CORRECTION.

Patent No. 2,005,711.

June 18, 1935.

HERBERT WILKENS DAUDT, ET AL.

It is hereby certified that error appears in the heading to the printed specification of the above numbered patent requiring correction as follows: Line 9, application clause, strike out the words "In Canada May 20, 1931"; same page, first column, line 11, for "1839" read 1889; and line 27, for "must" read much; and that the said Letters Patent should be read with these corrections therein that the same may conform to the record of the case in the Patent Office.

Signed and sealed this 23rd day of July, A. D. 1935.

(Seal)

Leslie Frazer
Acting Commissioner of Patents.